(12) United States Patent
Kragh

(10) Patent No.: US 7,252,584 B2
(45) Date of Patent: Aug. 7, 2007

(54) FISH PROCESSING MACHINE WITH ALIGNMENT DEVICES AND METHODS FOR REALIGNING FISH DURING PROCESSING

(75) Inventor: Henrik Kragh, Issaquah, WA (US)

(73) Assignee: American Seafood Company, LLC, Seattle, WA (US)

( * ) Notice: Subject to any disclaimer, the term of this patent is extended or adjusted under 35 U.S.C. 154(b) by 296 days.

(21) Appl. No.: 10/932,556

(22) Filed: Sep. 1, 2004

(65) Prior Publication Data

US 2005/0221747 A1 Oct. 6, 2005

(51) Int. Cl.
*A22B 5/20* (2006.01)

(52) U.S. Cl. ..................................... 452/163

(58) Field of Classification Search ............... 452/150, 452/155, 160–164; 198/400, 411, 412
See application file for complete search history.

(56) References Cited

U.S. PATENT DOCUMENTS

| | | | | |
|---|---|---|---|---|
| 1,689,920 A | * | 10/1928 | Heath | 452/179 |
| 3,514,811 A | * | 6/1970 | West | 452/179 |
| 4,557,020 A | * | 12/1985 | Wenzel | 452/179 |
| 4,613,031 A | * | 9/1986 | Wenzel | 452/179 |
| 5,090,941 A | * | 2/1992 | Dechow | 452/183 |
| 5,207,610 A | * | 5/1993 | Ogawa | 452/110 |
| 5,259,810 A | * | 11/1993 | Evers et al. | 452/149 |
| 5,330,383 A | * | 7/1994 | Ryan | 452/182 |
| 5,702,295 A | * | 12/1997 | Ketels | 452/180 |
| 5,735,735 A | * | 4/1998 | Hahn et al. | 452/119 |

FOREIGN PATENT DOCUMENTS

DE 3608320 A1 * 3/1986

* cited by examiner

*Primary Examiner*—Thomas Price
(74) *Attorney, Agent, or Firm*—Perkins Coie LLP

(57) ABSTRACT

Fish processing machines and methods for realigning fish during processing are disclosed herein. In one embodiment, a fish processing machine in accordance with the invention includes a fish processing unit for use with a processing machine having a fillet assembly and/or a skinner assembly. The processing unit includes an inspection assembly with a conveyor system operably coupled to the fillet assembly and/or skinner assembly and an alignment device operably coupled to the conveyor system. The conveyor system extends along a processing path to transport a fillet of fish that has been sliced from a trunk of the fish. The alignment device is positioned to automatically realign the fillet with respect to the processing path without manually manipulating the fillet before the fillet is transferred from the conveyor system to an inspection table.

29 Claims, 5 Drawing Sheets

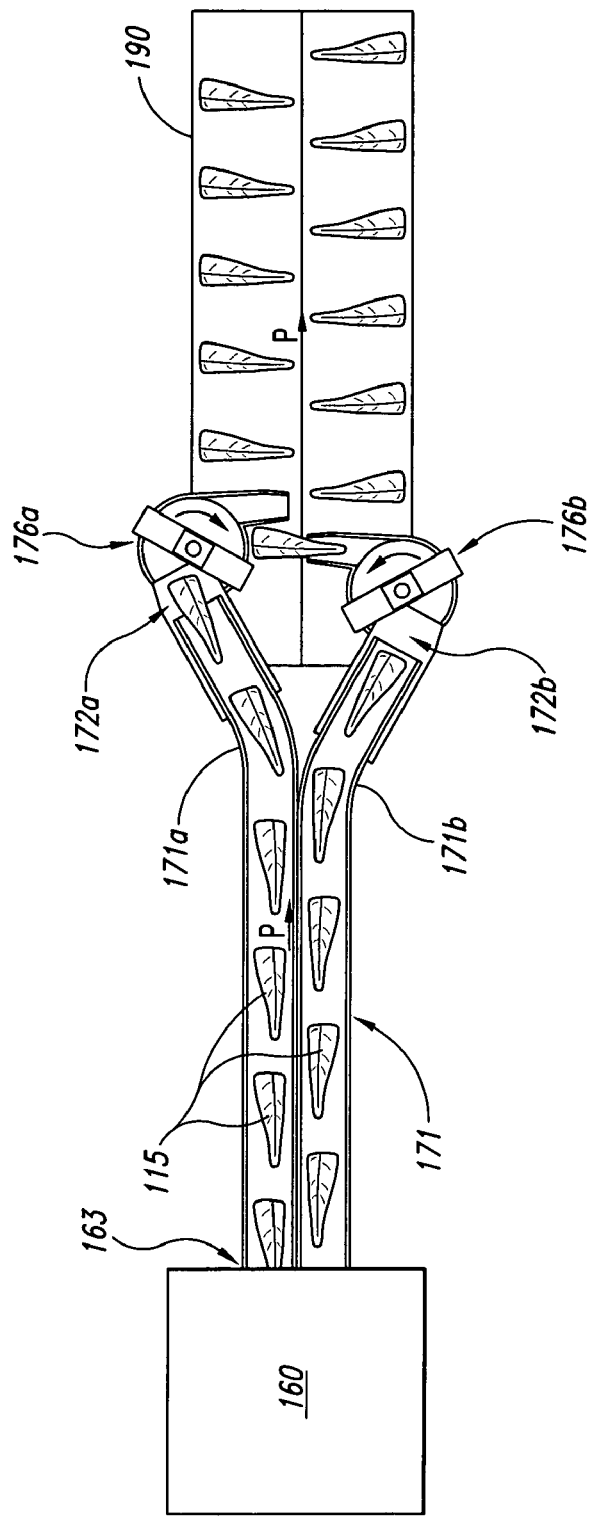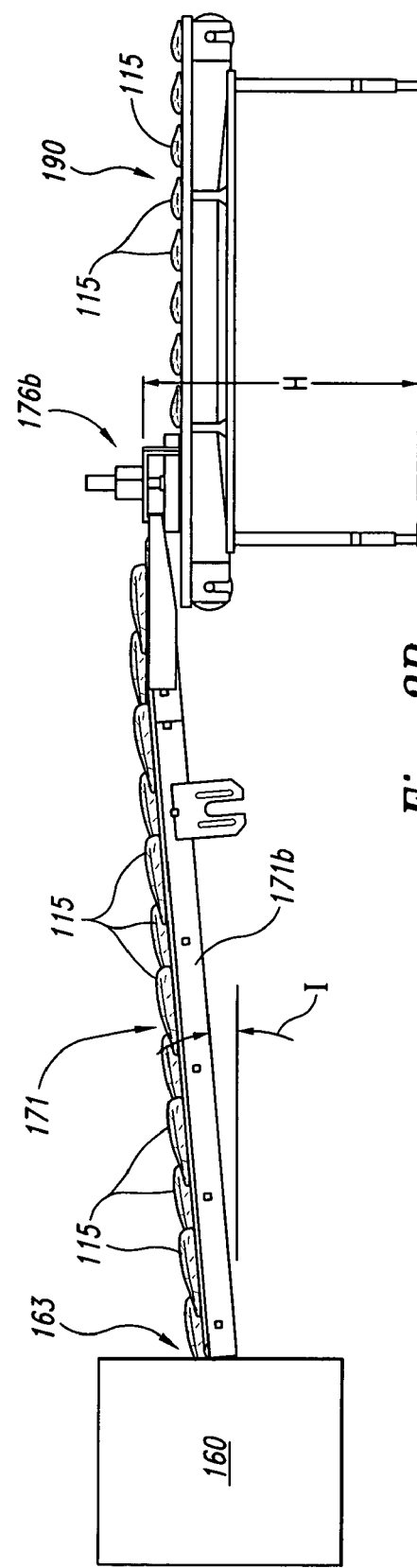
Fig. 3A
Fig. 3B

FISH PROCESSING MACHINE WITH ALIGNMENT DEVICES AND METHODS FOR REALIGNING FISH DURING PROCESSING

TECHNICAL FIELD

The present invention relates to commercial fish processing operations and, more particularly, to a fish processing machine with turntables or other alignment devices for automatically realigning fish during processing.

BACKGROUND

Commercial fish processing operations commonly process, package, and freeze fish on marine vessels immediately after harvesting the fish. Typical commercial processing vessels, for example, have a processing deck where fish are sorted by size and run through a fillet process line. The fillet process line typically includes equipment to sort, process, package, and store the fillets. For example, the fillet line first separates the waste body parts, such as bones, tails, heads, and organs, from the trunks of the fish. The trunks are then filleted, and the individual fillets are inspected, packaged, and frozen in a freezing hold.

One difficulty currently facing commercial fish processors is that it requires a significant amount of time and manpower to process the fish. Although a variety of the tasks are performed using automated equipment, a significant number of processing operations are performed manually. For example, one conventional processing operation includes preparing the fillets for inspection. In many instances, this process includes manually realigning the fish for inspection and further handling. The manual realignment process can require a significant amount of labor. In a typical operation, for example, four people are required just to realign the fillets. Such manual processing is particularly expensive because the commercial processors must provide living quarters and meals on board the vessel in addition to paying salaries and benefits. Thus, to be more competitive, commercial fish processors are seeking procedures and equipment to increase the efficiency and reduce the cost of fish processing operations.

BRIEF DESCRIPTION OF THE DRAWINGS

FIG. 3A is a top plan view of the inspection assembly and alignment devices shown in FIG. 2.

FIG. 3B is a side elevation view of the inspection assembly and alignment devices shown in FIG. 2.

DETAILED DESCRIPTION

A. Overview

The present invention is directed toward methods and apparatuses for handling fillets on a fish processing line. Many specific details of certain embodiments of the invention are set forth in the following description and in FIGS. 1–4B to provide a thorough understanding of such embodiments. One skilled in the art, however, will recognize that the invention can be practiced without one or more of the specific details explained in the following description. Moreover, although the following disclosure sets forth several embodiments of different aspects of the invention, several other embodiments of the invention can have different configurations or different components than those described in this section. As such, it should be understood that the invention may have other embodiments with additional elements or without several of the elements shown and described below with reference to FIGS. 1–4B.

Several aspects of the present invention are directed to fish processing machines with alignment devices for automatically realigning fish during processing. One embodiment of a fish processing machine in accordance with the invention includes a fish processing unit for use with a processing machine having a fillet assembly and/or a skinner assembly. The processing unit includes an inspection assembly with a conveyor system operably coupled to the fillet assembly and/or skinner assembly and an alignment device operably coupled to the conveyor system. The conveyor system extends along a processing path to transport a fillet of fish that has been sliced from a trunk of the fish. The alignment device can be a turntable positioned to automatically realign the fillet with respect to the processing path without manually manipulating the fillet before the fillet is transferred from the conveyor system to an inspection table.

A further aspect of the invention is directed to methods of realigning fish during processing. One embodiment of such a method includes transferring a fillet from a trunk portion of a fish along a processing path to an inspection assembly separate from a fillet machine and/or a skinner assembly. The method also includes realigning the fillet automatically without manual manipulation from a first position on a conveyor system generally parallel to the processing path to a second position on an inspection table generally normal to the processing path.

Figure 1:
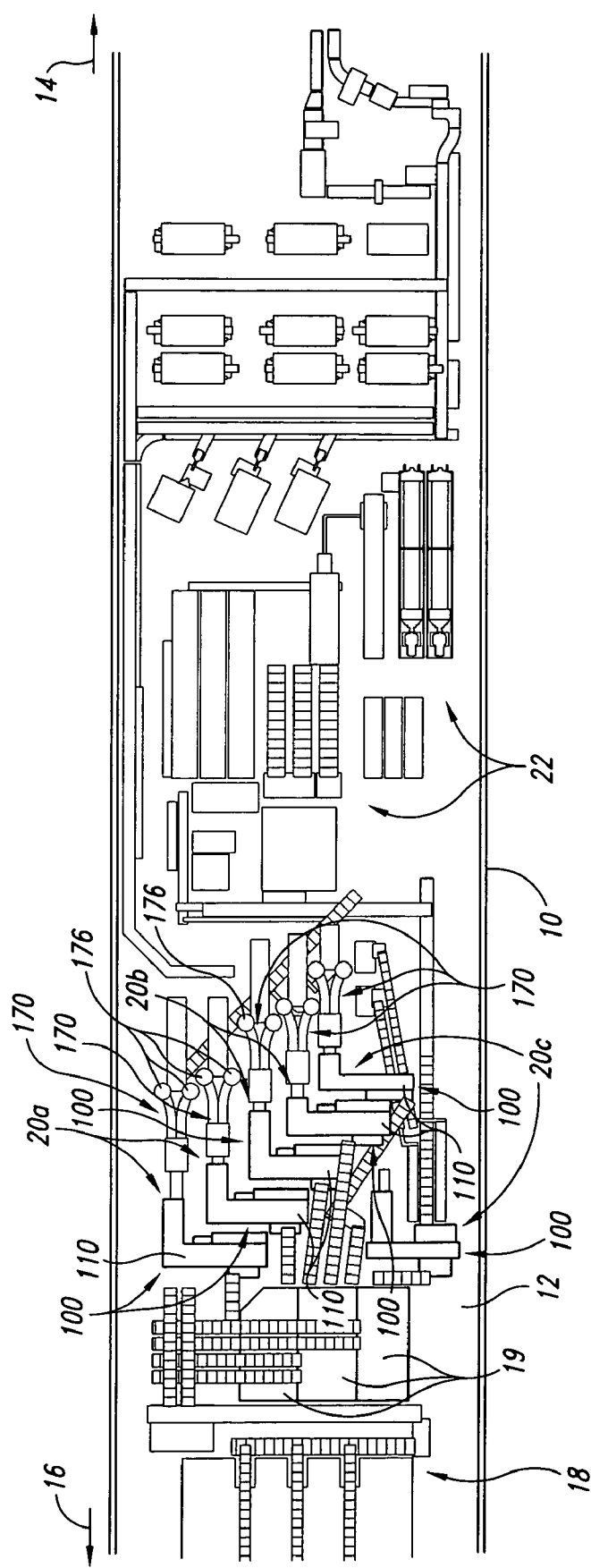
FIG. 1 is a top plan view of a processing deck in a marine vessel including fish processing machines with alignment devices in accordance with an embodiment of the invention.

B. Embodiments of Alignment Devices and Methods for Realigning Fish on a Fish Processing Line FIG. 1 is top plan view partially illustrating a marine vessel 10 having a process deck 12 extending from approximately the bow 14 of the vessel 10 to the stern 16. The process deck 12 includes a sorting area 18 where large, medium, and small fish are sorted and sent to holding tanks 19. The process deck 12 also includes one or more fillet process lines 20 and a surimi process line 22. In the illustrated embodiment, for example, the process deck 12 includes three fillet process lines 20 (identified individually as fillet lines 20a–20c). Fillet line 20a is configured to process large fish, fillet line 20b is configured to process medium size fish, and fillet line 20c is configured to process small fish. The individual fillet lines 20a–c further include a plurality of processing machines 100 to fillet, skin, extract additional meat from the fish, and prepare the fillets for inspection and storage. The process deck 12 can also include a fish meal processing station.

Each processing machine 100 can include an inspection assembly 170 having one or more alignment devices 176. The inspection assembly 170 is at a downstream end of the processing machine 100, and alignment devices 176 shown in FIG. 1 are turntables configured to reorient the fillets being processed by the processing machine 100. More specifically, the one or more turntables automatically realign fillets from a first position generally parallel to a processing path to a second position generally normal to the processing path without manually manipulating the fillets.

Figure 2:
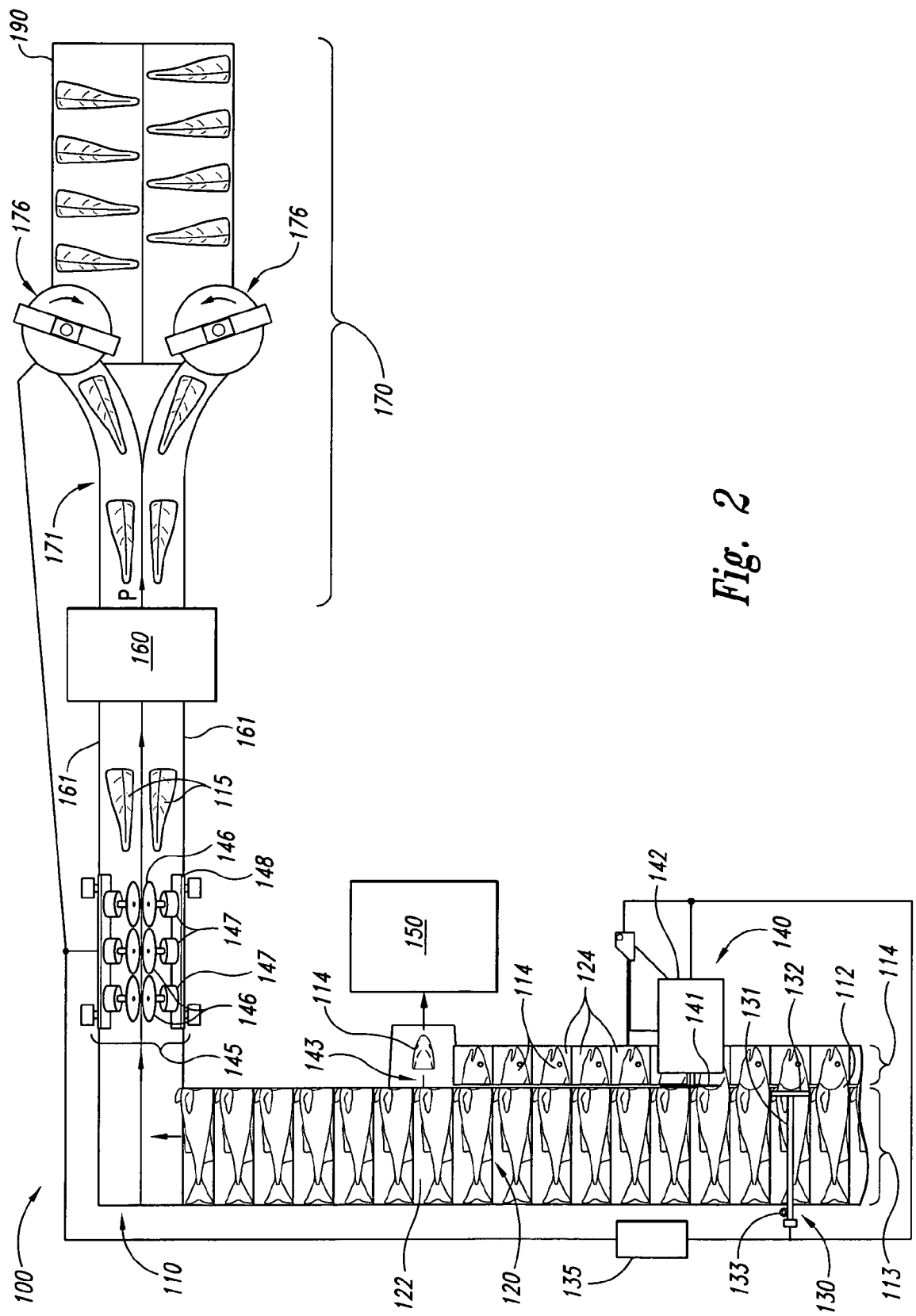
FIG. 2 is a top plan view of a fish processing machine including an inspection assembly having alignment devices in accordance with an embodiment of the invention.

FIG. 2 is a top plan view of an individual fish processing machine 100 in accordance with one embodiment of the invention. The fish processing machine 100 in the illustrated embodiment includes a fillet processing machine 110, a recovery apparatus 150 and a skinner assembly 160 operably coupled to the fillet machine 110, and the inspection assembly 170 having alignment devices 176 operably coupled to the skinner 160. The fillet processing machine 100 processes a fish 112 to extract high-value fillet and surimi meat from both a trunk portion 113 and a head portion 114. The fillet machine 110, for example, can include a conveyor system 120 having a plurality of primary compartments 122 to carry the trunk portions 113 and corresponding secondary compartments 124 to carry the heads 114.

The fillet machine 110 can also include a size sensor 130 that measures the size of each fish 112. The size sensor 130, for example, can include a pivoting lever 131, a wheel 132 attached to one portion of the lever 131, and a linear displacement device 133 attached to another portion of the lever 131. The wheel 132 rotates over the fish 112 causing the lever arm 131 to pivot about a pivoting point, and the linear displacement device 133 senses the angular displacement of the lever 131 to determine the thickness of each fish 112. The overall size of a fish 112 is proportional to its thickness, and thus the size sensor 130 can generate a signal corresponding to the relative size of each fish 112. The size sensor 112 is operatively coupled to a controller 135 that processes the size signal to operate other mechanisms of the fish processing machine 100, such as the fillet machine 110, the recovery apparatus 150, the skinner 160, and the alignment devices 176. Suitable size sensors 130 and controllers 135 are used in the Baader 212 Food Processing Machines manufactured by Nordischer Maschinenbau Rud. Baader GmbH+ Co. KG.

The fillet machine 110 can further include a head separator 140 downstream from the size sensor 130. The head separator 140 generally includes a circular blade 141 coupled to a motor 142 that rotates the blade 141.

The head separator 140 accordingly severs the heads 114 from the trunks 113 of the fish 112 so that the primary compartments 122 of the conveyor system 120 carry the trunks 113 to a fillet cutting assembly and the secondary compartments 124 carry the severed heads 114 to a disposal site 143.

The recovery apparatus 150 can be coupled to the fillet machine 110 at the disposal site 143 to reclaim significant volumes of meat from the heads 114 or other waste body parts that have been severed from the fish trunks 113. The reclaimed meat can be used for surimi or other high-value products. The recovery apparatus 150 may include configurations disclosed in U.S. Pat. No. 6,361,426 to American Seafoods Company, LLC, the assignee of the present application, which is incorporated herein by reference in its entirety.

The fillet machine 110 can also include a fillet cutting assembly 145 downstream from the head separator 140 and the recovery apparatus 150. The fillet cutting assembly 145 typically has a plurality of circular cutting blades or knives 146 that are coupled to drive motors 147, and an adjustment assembly 148 to adjust the spacing between the knives 146 according to the size of the fish 112 measured by the size sensor 130. The trunks 113 are then passed axially through the fillet cutting assembly 145 to slice fillets 115 from the trunks 113. The controller 135 is operatively coupled to the adjustment assembly 148 to move the cutting blades 146 toward/away from a processing axis through the fillet cutting assembly 145 according to the size of the fish 112 measured by the size sensor 130. Suitable fillet machines 110 with fillet cutting assemblies 145 are manufactured by Baader GmbH or Toyo Corporation.

The skinner assembly 160 can be operably coupled to the fillet machine 110 by one or more transfer chutes 161. The fillets 115 travel from the fillet cutting assembly 145 along the transfer chutes 161 and into the skinner 160. The skinner 160 is configured to remove at least a portion of the skin from each fillet 115. Suitable skinners 160 include the Baader 52 and Baader 54 manufactured by Nordischer Maschinenbau Rud. Baader GmbH+ Co. KG.

The inspection assembly 170 of the processing machine 100 is operably coupled to the skinner 160 to receive the fillets 115 from the skinner 160. In the illustrated embodiment, the inspection assembly 170 includes a conveyor system 171 extending along a processing path P, alignment devices 176 that automatically realign the fillets 115 with respect to the processing path P without manual manipulation, and an inspection table 190 where the fillets 115 are inspected and prepared for packaging and/or further processing.

FIG. 3A is a top plan view and FIG. 3B is a side elevation view illustrating an embodiment of the inspection assembly 170 in greater detail. Referring to FIGS. 3A and 3B together, the conveyor system 171 can be coupled to an outfeed portion 163 of the skinner 160 to move the fillets 115 from the skinner 160 along the processing path P to the alignment devices 176 (identified individually as a first turntable 176a and a second turntable 176b). The conveyor system 171 is inclined at an angle I upward away from the skinner 160 to move the fillets 115 to the working height H of the first and second turntables 176a and 176b. In the illustrated embodiment, the angle I can range from approximately 5° to 15° depending upon the space available for the conveyor system 171 on the processing deck 12 (FIG. 1). When space is limited, for example, the angle I is generally larger. (e.g., approximately 15 degrees). Alternatively, when there is more space for the conveyor system 171, the angle I is generally smaller (e.g., approximately 5 degrees). In other embodiments, the angle I may have a different range of values or the conveyor system 171 may be substantially flat (i.e., having approximately zero incline).

The conveyor 171 is a split conveyor including a first conveyor portion 171a and a second conveyor portion 171b. The first and second conveyor portions 171a and 171b are generally parallel to each other proximate the outfeed portion 163 of the skinner 160. The first and second conveyor portions 171a and 171b, however, are arranged at an angle to each other further downstream along the processing path P to define a generally Y-shaped conveyor system. In other embodiments, the conveyor system 171 may have different configurations. For example, the conveyor system 171 may have a different number of conveyor portions and/or the conveyor portions may be positioned differently with respect to each other. The first and second conveyor portions 171a and 171b are operably coupled to corresponding first and second turntables 176a and 176b, respectively, by transfer chutes 172 (identified individually as 172a and 172b). As shown in the illustrated embodiment, the fillets 115 can travel along the first and second conveyor portions 171a and 171b and pass through the corresponding transfer chutes 172 onto the turntables 176a and 172b.

Figure 4A:
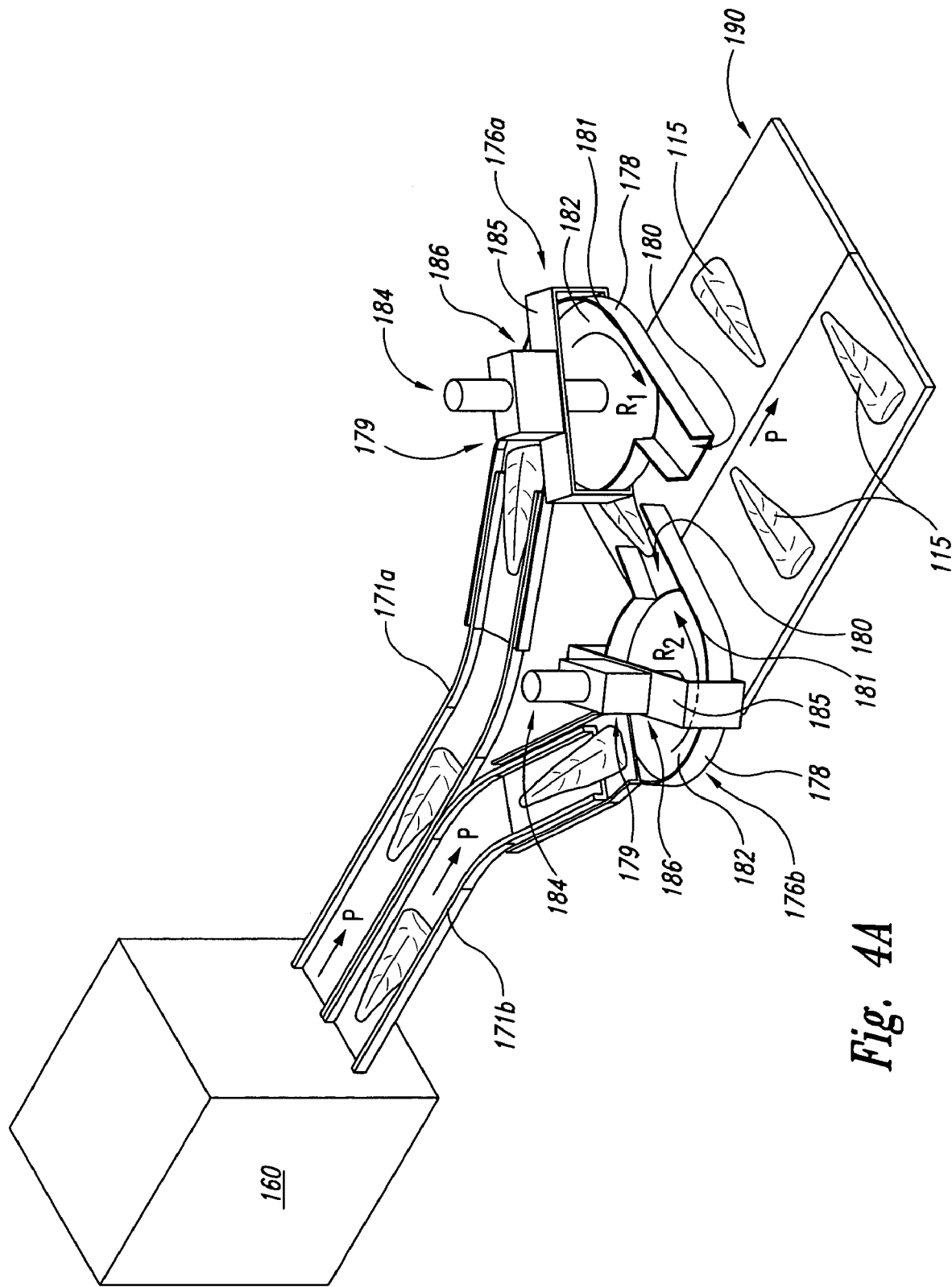
FIG. 4A is a top isometric view of the alignment devices shown in FIG. 2 in accordance with an embodiment of the invention.

FIG. 4A is a top isometric view illustrating the alignment devices 176 in greater detail. The individual first and second turntables 176a and 176b each include a housing 178 having an inlet portion 179 for receiving the fillets 115 from the transfer chute 172, a substantially flat disk 182 configured to reorient the fillets 115 with respect to the processing path P without manually manipulating the fillets 115, and an outlet portion 180 where the realigned fillets 115 are transferred to the inspection table 190. The housing 178 further includes a wall 181 projecting substantially normal to the disk 182. The wall 181 surrounds at least a portion of the disk 182 and provides a fixed surface to prevent the fillets 115 from moving off the disk 182 before they are deposited onto the inspection table 190 through the outlet portion 180 of the housing 178. In the illustrated embodiment, the disks 182 are formed of a high-density polyethylene material. In other embodiments, however, the disks 182 can be formed of other suitable materials known to those of skill in the art.

Each turntable 176a and 176b further includes a driver 184 and an actuator 186 operably coupling the driver 184 to the disk 182. In the illustrated embodiment, the driver 184 and actuator 186 are over the disk 182 on a support member 185, but in other embodiments the driver 184 can be in a different location with respect to the disk 182. The driver 184 in the illustrated embodiment is a hydraulic motor. In other embodiments, however, the driver 184 may include an electric motor or another type of apparatus configured to rotatably move the disk 182.

The driver 184 and actuator 186 rotatably move the disk 182 about a realignment axis in a clockwise and/or counterclockwise direction to realign the fillets 115 traveling along the processing path P. More specifically, the disk 182 of the first turntable 176a is rotating in a clockwise direction (as shown by arrow $R_1$) and the disk 182 of the second turntable 176b is rotating in a counterclockwise direction (as shown by arrow $R_2$). In the illustrated embodiment, the disks 182 are rotating between approximately 200 and 600 revolutions per minute (RPM), or more particularly, about 400 RPM. The rotational speed of the disks 182 is adjustable depending upon the size of the fillet 115 that must be reoriented. For example, if the fillets 115 are small, the disks 182 can be rotated at a lower rotational speed (e.g., approximately 200 to 400 RPM). Alternatively, the disks 182 can rotate at a higher rotational speed for larger fillets 115 (e.g., approximately 400 to 600 RPM). Although the disks 182 of the individual turntables 176a and 176b generally rotate at approximately the same rate, the disks 182 do not have to operate synchronously.

In several embodiments, the controller 135 (FIG. 2) can be operably coupled to the drivers 184 of the turntables 176a and 176b to automatically adjust the rotational speed of the corresponding disks 182 based on the size of the fish 112 (FIG. 2), as determined by the size sensor 130 (FIG. 2). In other embodiments, however, the drivers 184 can be controlled using different controllers and/or mechanisms.

Figure 4B:
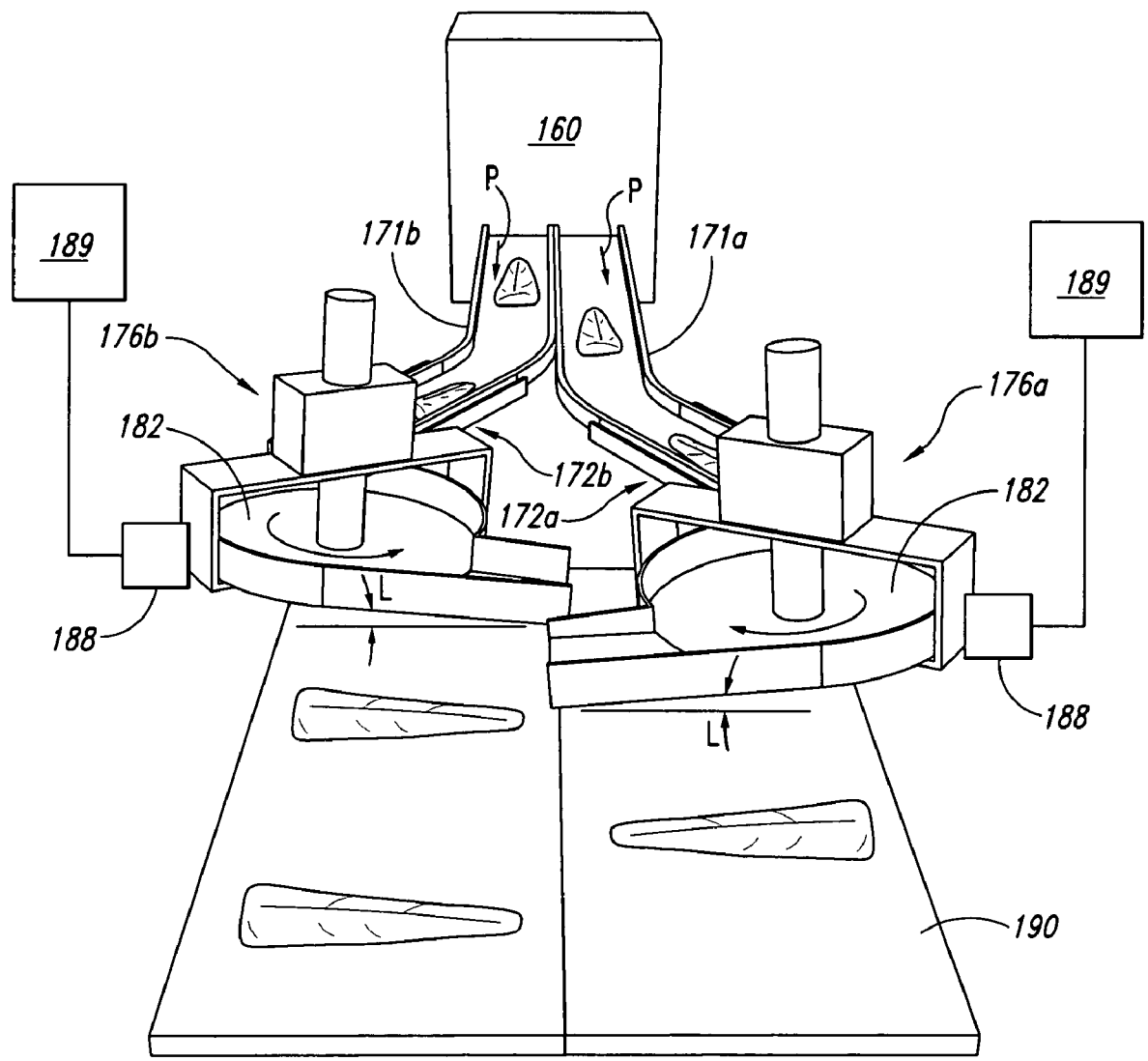
FIG. 4B is a front isometric view of the inspection assembly of FIG. 2 in accordance with an embodiment of the invention.

FIG. 4B is a front isometric view illustrating the inspection assembly 170 in greater detail. In several embodiments, the first and second turntables 176a and 176b of the inspection assembly 170 can be inclined relative to the inspection table 190 to compensate for the list of the vessel 10 (FIG. 1). The first and second turntables 176a and 176b include a height adjustment assembly 188 (shown schematically) positioned to raise and/or lower the turntables to a desired inclination. For example, the first and second turntables 176a and 176b illustrated in FIG. 4B are inclined at an angle L. The angle L can vary from 0° to 5° depending upon condition of the vessel 10. The height adjustment assembly can be operated manually or can be operably coupled to a controller 189 to automatically adjust the inclination based on a signal from the instrumentation of the vessel 10 indicating the vessel's current condition (e.g., the list of the vessel).

FIGS. 4A and 4B best illustrate the operation of the alignment devices 176. The fillets 115 are initially processed by the fillet machine 100 (FIG. 2) and the skinner 160 (FIG. 2) before being transferred to the conveyor system 171 of the inspection assembly 170. The fillets 115 are then carried by the first and second conveyor portions 171a and 171b along the processing path P to corresponding first and second turntables 176a and 172b. When the fillets 115 are traveling along the first and second conveyor portions 171a and 171b, the fillets are oriented generally parallel to the processing path P. At the first and second turntables 176a and 176b, the fillets 115 pass through the transfer chutes 172 onto the rotating disks 182. The disks 182 rotatably move the fillets 115 from the inlet portion 179 to the outlet portion 180, where the fillets 115 are deposited onto the inspection table 190. The realigned fillets 115 on the inspection table 190 are oriented generally normal the processing path P and in position for inspection, packaging, and/or further processing.

Several embodiments of the fish processing machine 100 with alignment devices 176 shown in FIGS. 1–4B are expected to increase the efficiency and yield of processing fish compared to the conventional manual processes described previously. For example, it is expensive to pay for additional personnel to manually reorient the fillets 115 before transferring the fillets to the inspection table 190. The alignment devices 176, however, automatically realign the fillets 115 without any manual manipulation. Therefore, no additional personnel are required for processing the fish.

Yet another advantage of the processing machine 100 described above is that the alignment devices 176 can automatically reorient the fillets 115 more quickly than manually manipulating the individual fillets 115. For example, the Baader and Toyo fillet machines can process the trunks of the fish quickly (e.g., 120–150 trunks/minute). Thus, the fillets 115 must be realigned for inspection at a rate that substantially matches the processing rate of the fillet machine 110. The embodiments of the alignment devices 176 described above allow the fillet machines 110 to operate at full capacity, which accordingly allows the entire processing operation to function more efficiently and substantially improves throughput.

From the foregoing, it will be appreciated that specific embodiments of the invention have been described herein for purposes of illustration, but that various modifications may be made without deviating from the spirit and scope of the invention. Accordingly, the invention is not limited except as by the appended claims.

I claim:

1. A fish processing unit for use with a processing machine having a fillet assembly and/or a skinner assembly, the processing unit comprising:
   an inspection assembly including a conveyor system operably coupled to the fillet assembly and/or skinner assembly and an alignment device operably coupled to the conveyor system, wherein the conveyor system extends along a processing path to transport a fillet of fish that has been sliced from a trunk of the fish, and wherein the alignment device is positioned to automatically realign the fillet with respect to the processing path without manually manipulating the fillet before the fillet is transferred from the conveyor system to an inspection table.

2. The processing unit of claim 1 wherein the alignment device comprises a turntable rotating in a clockwise and/or counterclockwise direction to realign the fillet from a first position generally parallel to the processing path to a second position generally normal to the processing path.

3. The processing unit of claim 1 wherein:
the conveyor system includes a first conveyor portion and a second conveyor portion; and
the alignment device comprises (a) a first turntable operably coupled to the first conveyor portion and rotating in a clockwise direction, and (b) a second turntable operably coupled to the second conveyor portion and rotating in a counterclockwise direction.

4. The processing unit of claim 1 wherein the fillet has a first position on the conveyor system generally parallel to the processing path and a second position on the inspection table generally normal to the processing path.

5. The processing unit of claim 1 wherein the alignment device comprises a turntable including:
a disk;
a driver; and
an actuator operably coupling the driver to the disk, and wherein the disk is configured to rotate in a clockwise and/or counterclockwise direction to realign the fillet from a first position generally parallel to the processing path to a second position generally normal to the processing path.

6. The processing unit of claim 1 wherein the alignment device comprises a turntable including:
a disk; and
a driver operably coupled to the disk by an actuator such that the disk is rotatably movable in a clockwise and/or, counterclockwise direction by the driver, wherein the driver includes a hydraulic motor.

7. The processing unit of claim 1 wherein the alignment device comprises a turntable including:
a disk; and
a driver operably coupled to the disk by an actuator such that the disk is rotatably movable in a clockwise and/or counterclockwise direction by the driver, wherein the driver includes an electric motor.

8. The processing unit of claim 1 wherein the alignment device comprises a turntable including:
a disk; and
a driver operably coupled to the disk by an actuator such that the disk is rotatably movable in a clockwise and/or counterclockwise direction by the driver, wherein the disk rotates at approximately 200–600 revolutions per minute.

9. The processing unit of claim 1 wherein the conveyor system comprises:
a first conveyor portion having a first section and a second section spaced apart from the first section along the processing path; and
a second conveyor portion having a first section and a second section spaced apart from the first section along the processing path, and wherein each of the first sections of the first and second conveyor portions are generally parallel to each other and each of the second sections of the first and second conveyor portions are arranged at an angle with respect to each other to define a generally Y-shaped conveyor system.

10. The processing unit of claim 1, further comprising:.
a fish size sensor to determine the size of each fish and generate a signal corresponding to the size of each fish; and
a controller operatively coupled to the size sensor and the alignment device, wherein the controller sends command signals to the alignment device to automatically control the alignment device in correspondence to the command signals.

11. The processing unit of claim 1 wherein the alignment device comprises a height adjustment assembly for selectively raising and lowering a portion of the alignment device to move the alignment device from a first angle of inclination with respect to the inspection table to a second angle of inclination with respect to the inspection table.

12. A fish processing machine, comprising:
a filleting assembly having a first conveyor system to transport a trunk of a fish and a fillet cutting assembly having at least one fillet knife arranged to slice a fillet of meat from the trunk;
a skinner assembly operably coupled to the filleting assembly, the skinner assembly configured to remove at least a portion of the skin from the fillet;
a second conveyor system operably coupled to the skinner assembly and extending along a processing path to transport the fillet that has been skinned, wherein the fillet is in a first position on the second conveyor system generally parallel to the processing path;
an alignment device positioned to automatically realign the skinned fillet with respect to the processing path without manually manipulating the fillet; and
an inspection table positioned to receive the realigned fillet from the alignment device, wherein the fillet is in a second position on the inspection table generally normal to the processing path.

13. The processing machine of claim 12 wherein the alignment device comprises a turntable rotating in a clockwise and/or counterclockwise direction to realign the fillet from the first position to the second position.

14. The processing machine of claim 12 wherein:
the second conveyor system includes a first conveyor portion and a second conveyor portion; and
the alignment device comprises (a) a first turntable operably coupled to the first conveyor portion and rotating in a clockwise direction, and (b) a second turntable operably coupled to the second conveyor portion and rotating in a counterclockwise direction.

15. The processing machine of claim 12 wherein the alignment device comprises a turntable including:
a disk;
a driver; and
an actuator operably coupling the driver to the disk, and wherein the disk is configured to rotate in a clockwise and/or counterclockwise direction to realign the fillet from the first position on the second conveyor system to the second position on the inspection table.

16. The processing machine of claim 12 wherein the alignment device comprises a turntable including:
a disk; and
a driver operably coupled to the disk by an actuator such that the disk is rotatably movable in a clockwise and/or counterclockwise direction by the driver, wherein the driver includes a hydraulic motor.

17. The processing machine of claim 12 wherein the alignment device comprises a turntable including:
a disk; and
a driver operably coupled to the disk by an actuator such that the disk is rotatably movable in a clockwise and/or counterclockwise direction by the driver, wherein the driver includes an electric motor.

18. The processing machine of claim 12 wherein the alignment device comprises a turntable including:
a disk; and a driver operably coupled to the disk by an actuator such that the disk is rotatably movable in a clockwise and/or counterclockwise direction by the driver, wherein the disk rotates at approximately 200–600 revolutions per minute.

19. The processing machine of claim 12 wherein the second conveyor system comprises:
a first conveyor portion having a first section and a second section spaced apart from the first section along the processing path; and
a second conveyor portion having a first section and a second section spaced apart from the first section along the processing path, and wherein each of the first sections of the first and second conveyor portions are generally parallel to each other and each of the second sections of the first and second conveyor portions are arranged at an angle with respect to each other to define a generally Y-shaped conveyor system.

20. The processing machine of claim 12, further comprising:
a fish size sensor to determine the size of each fish and generate a signal corresponding to the size of each fish; and
a controller operatively coupled to the size sensor and the alignment device, wherein the controller sends command signals to the alignment device to automatically control the alignment device in correspondence to the command signals.

21. The processing machine of claim 13 wherein the alignment device comprises a height adjustment assembly for selectively raising and lowering a portion of the alignment device to move the alignment device from a first angle of inclination with respect to the inspection table to a second angle of inclination with respect to the inspection table.

22. A fish processing unit for use with a fish processing machine, comprising:
a conveyor system to receive fillets that have been separated from trunk portions of fish, the conveyor system having (a) a first conveyor portion with a first section and a second section spaced apart from the first section along a processing path, and (b) a second conveyor portion with a first section and a second section spaced apart from the first section along the processing path, wherein each of the first sections of the first and second conveyor portions are generally parallel to each other and each of the second sections of the first and second conveyor portions are arranged at an angle with respect to each other to define a generally Y-shaped conveyor system;
a first turntable at the second section of the first conveyor portion, the first turntable rotating clockwise about a first realignment axis;
a second turntable at the second section of the second conveyor portion, the second turntable rotating counterclockwise about the second realignment axis, wherein the first and second turntables are positioned to automatically realign the fillets from a first position generally parallel to the processing path to a second position generally normal to the processing path without manually manipulating the fillets; and
an inspection table positioned to receive the realigned fillets from the first and second turntables.

23. The processing unit of claim 22 wherein the individual first and second turntables comprise:
a disk:
a driver; and
an actuator operably coupling the driver to the disk, and wherein the disk is configured to rotate in a clockwise and/or counterclockwise direction to realign the fillets from the first position to the second position.

24. The processing unit of claim 22 wherein the individual first and second turntables comprise:
a disk; and
a driver operably coupled to the disk by an actuator such that the disk is rotatably movable in a clockwise and/or counterclockwise direction by the driver, wherein the driver includes a hydraulic motor.

25. The processing machine of claim 22 wherein the individual first and second turntables comprises:
a disk; and
a driver operably coupled to the disk by an actuator such that the disk is rotatably movable in a clockwise and/or counterclockwise direction by the driver, wherein the driver includes an electric motor.

26. The processing unit of claim 22 wherein the individual first and second turntables comprise:
a disk; and
a driver operably coupled to the disk by an actuator such that the disk is rotatably movable in a clockwise and/or counterclockwise direction by the driver, wherein the disk rotates at approximately 200–600 revolutions per minute.

27. The processing unit of claim 22, further comprising:
a fish size sensor to determine the size of each fish and generate a signal corresponding to the size of each fish; and
a controller operatively coupled to the size sensor and the first and/or second turntable, wherein the controller sends command signals to the first and/or second turntable to automatically control a rotational speed of the first and/or second turntable in correspondence to the command signals.

28. The processing unit of claim 22 wherein the individual first and/or second turntables comprise a height adjustment assembly for selectively raising and lowering a portion of the first and/or second turntable to move the first and/or second turntable from a first angle of inclination with respect to the inspection table to a second angle of inclination with respect to the inspection table.

29. A fish processing unit for use with a fish processing machine, comprising:
transport means extending along a processing path to transport a fillet of fish that has been sliced from a trunk of a fish; and
realignment means operably coupled to the transport means to automatically move the fillet without manual manipulation from a first position on the transport means generally parallel with the processing path to a second position on an inspection table generally normal to the processing path.

* * * * *

UNITED STATES PATENT AND TRADEMARK OFFICE
CERTIFICATE OF CORRECTION

PATENT NO. : 7,252,584 B2  Page 1 of 1
APPLICATION NO. : 10/932556
DATED : August 7, 2007
INVENTOR(S) : Kragh It is certified that error appears in the above-identified patent and that said Letters Patent is hereby corrected as shown below:

In column 3, lines 38-43, delete "The head separator 140 accordingly severs the heads 114 from the trunks 113 of the fish 112 so that the primary compartments 122 of the conveyor system 120 carry the trunks 113 to a fillet cutting assembly and the secondary compartments 124 carry the severed heads 114 to a disposal site 143." and insert the same on Col. 3, Line 37 (Approx.), after "141.", as a continuation of the same paragraph.

In column 4, line 62, delete "172b." and insert -- 176b. --, therefor.

In column 6, line 8, delete "172b." and insert -- 176b. --, therefor.

In column 7, line 30, in Claim 6, delete "and/or," and insert -- and/or --, therefor.

In column 7, line 62, in Claim 10, delete "comprising:." and insert -- comprising: --, therefor.

In column 10, line 3, in Claim 23, delete "disk:" and insert -- disk; --, therefor.

In column 10, line 18, in Claim 25, delete "comprises:" and insert -- comprise: --, therefor.

Signed and Sealed this

Eighth Day of July, 2008

JON W. DUDAS
*Director of the United States Patent and Trademark Office*